June 17, 1930.  C. B. COMSTOCK  1,764,550
FEEDING APPARATUS FOR BAKERS' OVENS
Filed May 16, 1927    2 Sheets-Sheet 1
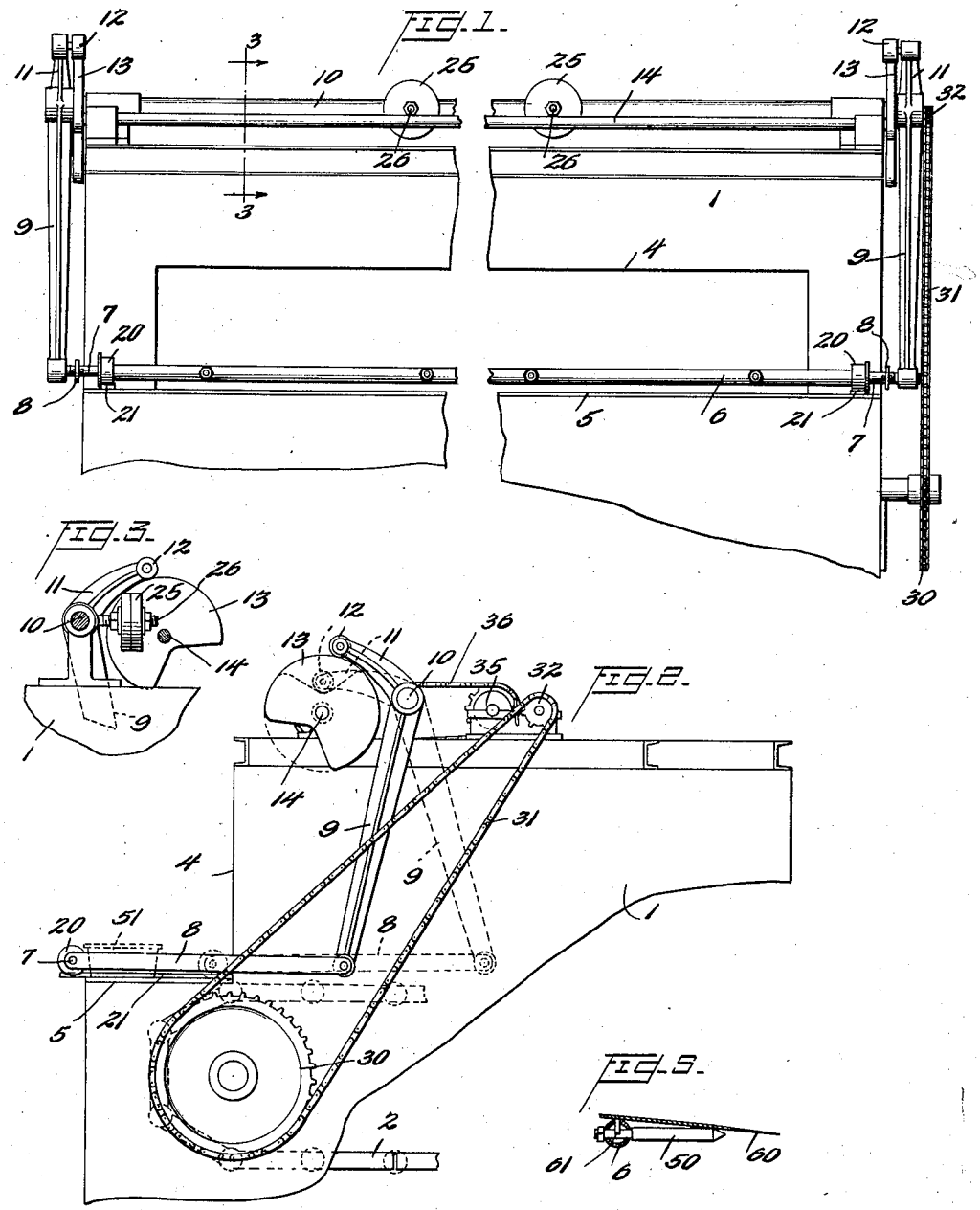
Inventor
Corry B. Comstock June 17, 1930.　　　C. B. COMSTOCK　　　1,764,550
FEEDING APPARATUS FOR BAKERS' OVENS
Filed May 16, 1927　　2 Sheets-Sheet 2
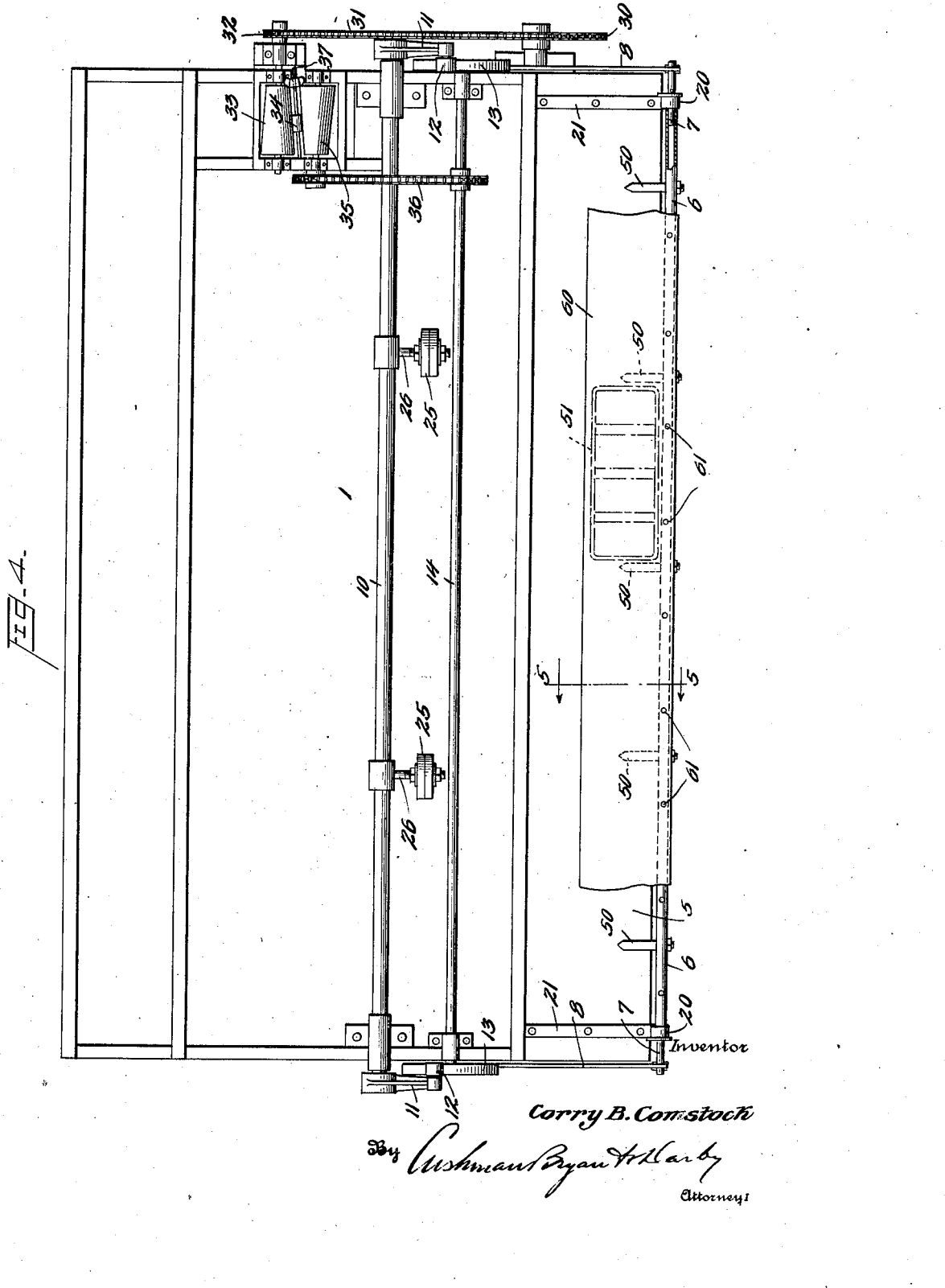
Inventor
Corry B. Comstock Patented June 17, 1930

1,764,550

UNITED STATES PATENT OFFICE

CORRY B. COMSTOCK, OF NEW YORK, N. Y., ASSIGNOR TO COMSTOCK OVEN COMPANY, INC., OF NEW YORK, N. Y., A CORPORATION OF NEW YORK

FEEDING APPARATUS FOR BAKERS' OVENS

Application filed May 16, 1927. Serial No. 191,879.

The present invention relates to improvements in bakers ovens, and especially to means for feeding to the interior of the baking chamber the articles to be baked therein.

In particular, the present improvements are intended for use with ovens for baking loaf cake or bread, and one of the objects of the invention is to provide a feeding means which may be employed for feeding either "pan" bread or "bottom" bread to the baking chamber.

Another object of the invention is to provide a construction particularly adapted for use with ovens including an endless conveyor for transporting the articles being baked through the baking chamber in which the movement of the feeder to position articles moved thereby on the oven conveyor will be independent of movement of said conveyor while the return movement of the feeding means will be actuated by the conveyor. By this means I am able to avoid certain practical objections that have been incident to constructions heretofore proposed for feeding articles to be baked onto the oven conveyor.

With the foregoing and other objects in view the invention consists in the construction and arrangement of parts that will be hereinafter more particularly described, reference being had to the accompanying drawings, in which:

Figure 1 is a front elevation of a bakers oven provided with feeding means embodying the present invention.

Figure 2 is a side elevation of the oven and feeding device, the latter being shown adapted for use in baking pan bread.

Figure 3 is a detail section substantially on the line 3—3 of Fig. 1.

Figure 4 is a plan.

Figure 5 is a detail section substantially on the line 5—5 of Fig. 4.

Referring to the drawings, in the several figures of which corresponding parts are designated by the same reference characters, 1 designates the body of a baker's oven which may be of any suitable construction and which, as shown, is of the type in which an endless conveyor 2 is provided for transporting the articles being baked through the baking chamber.

As is customary, the oven is provided in advance of the inlet 4 with a feed table 5 and the feeding devices, constituting the present invention, include a cross bar 6 extending transversely of such feed table and adapted to be reciprocated thereover toward and from the oven inlet 4.

As shown this cross bar may be a hollow tube or pipe in the opposite ends of which are secured gudgeons 7, the outer ends of which are engaged by links 8 with the lower ends of arms 9 depending from a shaft 10 mounted in bearings above the oven. As shown the arms 9 are preferably members of bell crank levers, the shorter arms 11 of which extend forward from the shaft 10 and at their outer ends support rollers 12 which cooperate with cams 13 mounted on the ends of a shaft 14 and adapted to be rotated to effect a rocking of the shaft 10, and consequent reciprocation of the cross bar 6 over the feeding table 5.

As shown, the cross bar 6 does not contact with the feed table, but is supported by suitable wheels or rollers 20, mounted to rotate on the gudgeons or pintles 7 and bearing upon track members 21 on the upper face of the table. This means of supporting the cross bar of the feeding means reduces to a minimum the friction between the parts and facilitates the easy operation thereof.

The form of the cams 13 is such that as they are rotated, for example by the means hereinafter described, the shaft 10 will be positively rocked to move the lower ends of the lever arms 9 forward to carry the cross bar 6 away from the baking chamber, and independent means are provided for moving the cross bar in the opposite direction or toward said inlet. As shown, this means consists of weights mounted on studs 26 projecting forward from collars secured to the shaft 10. The weights 25 are adustable lengthwise of the studs 26 being secured thereon by suitable nuts so that the total amount of weight employed for moving the cross bar 6 toward the oven may be varied as desired.

Preferably, and as shown, the cams 13 are rotated by connections with the oven conveyor 2. In the embodiment of the invention illustrated, a sprocket 30 on the driven shaft of the oven conveyor 2 is connected by a suitable chain 31 with a sprocket 32. This latter sprocket is mounted on the shaft of a friction drum 33, which through the medium of a friction roll 34 transmits power to a second friction drum 35, and a pulley or sprocket on the latter is connected by a belt or chain 36 with a pulley or sprocket on the cam supporting shaft 14. As shown, the friction drums 33, 35 are slightly tapered longitudinally and are reversely arranged. The intermediate transmission roll 34 is adapted to be adjusted axially of said power drums as by means of a nut and screw 37. By this means, the speed of rotation of the cams can be accurately maintained in proper relation to that of the oven conveyor.

A plurality of fingers or pins 50 are secured to and project from the cross bar 6 toward the oven inlet. These pins or fingers are arranged in substantially horizontal position and are spaced apart a distance sufficient to provide spaces adapted to receive a nest of pans 51 such as are used for baking "pan" bread or loaf cake. It is usual to include in each of such nests of pans receptacles for four or five loaves.

The pins 50 may be detachably connected to the cross bar 6 so that the spacing thereof may be varied to adapt the means for feeding nests of pans of different sizes.

To the cross bar 6 is detachably connected a thin metal plate 60 which projects forward from the cross bar beyond the ends of the pins 50 and serves as a support for loaves of bottom bread. As shown, the plate 60 is connected with the cross bar 6 by having a plurality of depending pins 61 extending into sockets formed in the cross bar so that the plate and cross bar will move together as a unitary structure.

It will be understood that the action of the mechanism in feeding bottom bread to the oven conveyor will be substantially the same as the hand operated peel commonly employed by bakers. That is, at each movement of the feeding cross bar toward the oven, the loaves resting on the plate 60 will be brought into position above the conveyor 2 and then as the arms 11 of the bell crank levers connected with the cross bar are actuated by the cams 13, the reverse movement of the shaft 10 will withdraw the plate 60 from beneath the loaves and they will thereby be deposited on the conveyor. The shape of the cams may be such that the first portion of the movement of the feeder away from the oven will be a rather quick sudden one which will assist in withdrawing the plate 60 from beneath the loaves of dough resting thereon.

As noted, by removing the plate 60 the feeder is adapted for feeding nests of pans to the oven. When used for this purpose, the pins or fingers 50 serve to enable the nests of pans to be properly positioned, the pins being spaced or separated distances substantially corresponding in length to the particular nests of pans which are to be used. The pins or fingers 50 insure that as the different nests of pans are delivered into the baking chamber they will be separated or spaced laterally, so that the end pans of each nest will be uniformly heated.

It is believed that the operation of the improvements and the advantages thereof will be apparent from the foregoing description in connection with the drawings. It will be noted that the invention provides a very simple and effective means for feeding articles to the baking chamber of an oven and one in which there is no danger of the parts jamming or the action of the feeder, in any manner, interfering with the proper operation of the oven conveyor. The latter serves to positively move the cross bar of the feeding means outward or away from the oven while the movement in the reverse direction is effected by the weights 25. The slight friction between the supporting wheels or rollers 20 of the transverse feed bar and the feed table, due to the weight of the articles to be moved, is easily overcome by the weights, and if for any reason the oven conveyor is stopped the movement of the feeding devices will also cease.

The fact that the movement of bread into the oven is effected by the action of the counterweights instead of by positive connection with the conveyor or power devices, so that any danger of damage to either the pusher or parts of the oven if said feeding is in any way obstructed is avoided, is considered to be of the greatest importance.

It will be, of course, understood that in the drawings many of the parts are shown more or less diagrammatically and conventionally, and that there can be considerable modification of the details shown without departing from the scope of the invention. Except where specifically noted in the appended claims, the invention is not to be understood as limited to the exact arrangement shown by the drawings and they are to be considered as illustrative rather than restrictive of the invention.

While a particular form of driving connection between the oven conveyor and the cam shaft 14 has been described, it will be appreciated that various forms of connection may be employed for this purpose.

What I claim is:—

1. The combination with a baker's oven provided with an endless conveyor for transporting articles through the baking chamber thereof and having a feeding table in front of the inlet to said chamber, of means for moving articles to be baked through said inlet and onto the oven conveyor including a bar-like member extending transversely of the feed table and adapted to be reciprocated to and from the oven inlet, means actuated by the oven conveyor for moving said member away from the oven, and independent means for moving said member toward the oven.

2. The combination with a baker's oven provided with an endless conveyor for transporting articles through the baking chamber thereof and having a feeding table in front of the inlet to said chamber, of means for moving articles to be baked through said inlet and onto the oven conveyor including a bar-like member extending transversely of the feed table and adapted to be reciprocated to and from the oven inlet, means actuated by the oven conveyor for moving said member away from the oven at a predetermined speed, and independent means for moving said member toward the oven more rapidly than it was moved by the conveyor.

3. The combination with a baker's oven provided with an endless conveyor for transporting articles to be baked through the baking chamber thereof, of a shaft extending transversely across the top of the oven adjacent the inlet thereto, arms depending from said shaft at opposite sides of the oven, a horizontal cross bar extending across the inlet to the oven, links connecting the ends of the cross bar with said arms, rotary cam means cooperating with said shaft to rock it and said arms to carry the cross bar away from the oven inlet, means for driving said cam means and means cooperating with the shaft for rocking it in the opposite direction.

4. The combination with a baker's oven, of a shaft extending transversely across the top of the oven adjacent the inlet thereto, arms depending from said shaft at opposite sides of the oven, a horizontal cross bar extending across the inlet to the oven, links connecting the ends of the cross bar with said arms, rotary cam means cooperating with said shaft to rock it and said arms to carry the cross bar away from the oven inlet, power means for driving said cam means, and adjustable weights connected with the shaft and adapted to rock it in the direction opposite that in which it is moved by the cam means.

5. The combination with a baker's oven having a feed table in advance of the inlet to said chamber, of two levers positioned at opposite sides of the oven, a horizontal cross bar extending across the oven inlet and provided with rollers that rest on the feed table, links connecting the ends of said cross bar with said levers, rotary cams cooperating with said levers for rocking them to move the cross bar away from the oven, means for rotating said cams, and means for moving said levers and bar in the opposite direction.

6. The combination with a baker's oven provided with an endless conveyor for transporting articles to be baked through the baking chamber thereof, and having a feed table in advance of the inlet to said chamber, of a shaft extending transversely across the top of the oven adjacent the inlet thereto, arms depending from said shaft at opposite sides of the oven, a horizontal cross bar extending across the inlet to the oven, links connecting the ends of the cross bar with said arms, rotary cam means cooperating with the shaft to rock it to carry the cross bar away from the oven inlet, means for driving said cam means from the oven conveyor, and means for rocking the shaft in the opposite direction.

7. The combination with a baker's oven having a feed table in advance of the inlet to said chamber, of means for moving dough containing pans or loaves of dough over the feed table and into the baking chamber of the oven comprising a bar extending across the table, a plurality of pins projecting from said bar toward the oven, a dough receiving plate detachably supported on said bar and pins, and means for reciprocating said bar and plate over the table to and from the inlet to the baking chamber of the oven.

8. The combination with a baker's oven having a feed table in advance of the inlet to said chamber, of means for moving dough containing pans over the feed table and into the baking chamber of the oven comprising a bar extending across the table and provided with a plurality of pins projecting therefrom toward the oven and spaced a predetermined distance apart, and means for reciprocating said bar over the feed table.

9. The combination with a baker's oven provided with an endless conveyor for transporting articles to be baked through the baking chamber thereof and having a feed table in advance of the inlet to said chamber, of means for moving dough containing pans over the feed table and onto the conveyor within the oven comprising a bar extending across the table and having a plurality of pins projecting therefrom toward the oven and spaced apart distances corresponding to the sizes of the pans to be moved, and means for reciprocating said bar over the table toward and from the oven.

10. The combination with a baker's oven provided with an endless conveyor for transporting articles to be baked through the baking chamber thereof and having a feed table in advance of the inlet to said chamber, of means for moving dough containing pans over the feed table and onto the conveyor within the oven comprising a bar extending across the table and having a plurality of pins projecting therefrom toward the oven and spaced apart distances corresponding to the sizes of the pans to be moved, means actuated by the oven conveyor for moving said bar over the table away from the oven, and independent means for moving said bar in the opposite direction.

11. The combination with a baker's oven, of means for feeding articles to be baked into the oven comprising two levers positioned at opposite sides of the oven, a horizontal cross bar extending across the inlet to the oven, links connecting the ends of said bar to the levers, a rotary cam cooperating with each lever to positively rock it in one direction, means for rotating said cams, and means for moving said levers and connected cross bar in opposition to said cams.

12. The combination with a baker's oven, of means for feeding articles to be baked into the oven comprising two levers positioned at opposite sides of the oven, a horizontal cross bar extending across the inlet to the oven, links connecting the ends of said bar to the levers, a rotary cam cooperating with each lever, on the opposite side of the axis thereof from its connection with the cross bar to positively rock the levers to carry the cross bar away from the oven inlet, means for rotating the cams, and means for moving the levers and connected cross bar toward the oven inlet.

13. The combination with a baker's oven, of means for feeding articles to be baked into the oven comprising two bell crank levers positioned at opposite sides of the oven, a horizontal cross bar extending across the inlet to the oven, to the longer arms of the bell crank levers, a rotary cam cooperating with the shorter arm of each bell crank lever, means for rotating said cams, and weights connected with the levers to move them and the connected cross bar in opposition to the cams.

14. The combination with a baker's oven, of means for feeding articles to be baked into the oven comprising a shaft extending transversely of the oven adjacent the inlet thereto, arms on said shaft, a horizontal cross bar extending across the inlet to the oven, connected with said arms, rotary cam means cooperating with said shaft to rock it and the arms to carry the cross bar away from the oven inlet, and means connected with said shaft for rocking it in the opposite direction.

15. The combination with a baker's oven, of means movable through the oven inlet for depositing articles to be baked within the oven, said means being positively actuated to move from the oven and actuated by gravity to move articles into the oven.

16. The combination with a baker's oven provided with an endless conveyor for transporting articles through the baking chamber thereof, of means movable through the oven inlet for depositing articles to be baked on the conveyor, said means being actuated to move out of the oven by power from the conveyor and actuated by gravity to move articles into the oven.

17. The combination with a baker's oven, of means movable through the oven inlet for depositing articles to be baked within the oven, said means being actuated by gravity to move articles into the oven and positively actuated to move out of the oven at a different speed.

In testimony whereof I have hereunto set my hand.

CORRY B. COMSTOCK.